(12) United States Patent
Shahin et al.

(10) Patent No.: US 12,384,331 B2
(45) Date of Patent: Aug. 12, 2025

(54) DRUM BRAKE ASSEMBLY WITH BRAKE LINER INTEGRATED INTO BRAKE DRUM

(71) Applicant: HL MANDO CORPORATION, Pyeongtaek-si (KR)

(72) Inventors: Hatem Shahin, Pfaffenhofen (DE); Kai Braun, Friedrichsdorf (DE); Lothar Wagner, Simmern (DE)

(73) Assignee: HL MANDO CORPORATION, Pyeongtaek (KR)

( * ) Notice: Subject to any disclaimer, the term of this patent is extended or adjusted under 35 U.S.C. 154(b) by 319 days.

(21) Appl. No.: 17/992,215

(22) Filed: Nov. 22, 2022

(65) Prior Publication Data

US 2023/0159006 A1 May 25, 2023

(30) Foreign Application Priority Data

Nov. 22, 2021 (DE) .......................... 102021213108.5

(51) Int. Cl.
| | | |
|---|---|---|
| *B60T 1/06* | (2006.01) | |
| *F16D 51/10* | (2006.01) | |
| *F16D 65/10* | (2006.01) | |
| *F16D 69/04* | (2006.01) | |
| *F16D 65/02* | (2006.01) | |

(52) U.S. Cl.
CPC .............. *B60T 1/067* (2013.01); *F16D 51/10* (2013.01); *F16D 65/10* (2013.01); *F16D 69/04* (2013.01); *F16D 2065/1324* (2013.01); *F16D 2069/0425* (2013.01); *F16D 2200/0013* (2013.01)

(58) Field of Classification Search
None
See application file for complete search history.

(56) References Cited

U.S. PATENT DOCUMENTS

| | | | | |
|---|---|---|---|---|
| 2,293,914 | A | * 8/1942 | Nanfeldt | .............. F16D 69/022 |
| | | | | 523/159 |
| 2010/0140033 | A1 | 6/2010 | Monsere et al. | |
| 2012/0137485 | A1* | 6/2012 | Ricci | ................... F16D 69/0416 |
| | | | | 188/236 |

FOREIGN PATENT DOCUMENTS

| | | | | |
|---|---|---|---|---|
| CN | 107923454 A | * | 4/2018 | ............. F16D 51/10 |
| CN | 108869579 B | * | 4/2020 | ............. F16D 51/10 |
| DE | 2264275 A1 | | 7/1974 | |
| DE | 3508109 A1 | | 9/1986 | |
| DE | 102017207062 A1 | | 10/2018 | |
| EP | 0002581 A1 | * | 6/1979 | |

(Continued)

OTHER PUBLICATIONS

EP0002581A1—English Machine Translation (Year: 1979).*
CN-108869579-B—English Machine Translation (Year: 2020).*
CN-107923454-A—English Machine Translation (Year: 2018).*

*Primary Examiner* — Melanie Torres Williams
(74) *Attorney, Agent, or Firm* — Harvest IP Law, LLP

(57) ABSTRACT

The disclosure concerns a Drum brake assembly (10) for a motor vehicle,
the drum brake assembly (10) having:
  a brake drum housing (16);
  at least one brake shoe (26);
  a brake lining (18);
wherein the brake lining (18) is arranged at an inner circumferential face (24) of the brake drum housing (16) and the brake shoe (26) is displaceable relative to the brake lining (18), so as to contact the brake lining (18) during braking. Also disclosed is a drake drum assembly (14) for a motor vehicle Method a for producing such a brake drum assembly (14).

9 Claims, 3 Drawing Sheets

(56) References Cited

FOREIGN PATENT DOCUMENTS

EP 3707405 B1 7/2021
KR 10-2005-0042692 A 5/2005

* cited by examiner

DRUM BRAKE ASSEMBLY WITH BRAKE LINER INTEGRATED INTO BRAKE DRUM

The invention relates to a drum brake assembly, a brake drum assembly and a method for producing a brake drum assembly.

Drum brakes are widely used as wheel brakes in motor vehicles, such as in cars and trucks. They typically comprise a brake drum that is fixed to a rotatable component, e.g. to an axle or wheel hub.

The brake drum, which is typically configured as a pot-shaped member and/or cylindrical member with an open base, has an inner circumferential face that faces brake shoes carrying a brake lining. The brake shoes are connected to a stationary part of the drum brake that is typically referred to as a backing plate. During braking, the brake shoes are moved relative to the brake drum, in particular in a radial direction with reference to a rotational axis of the brake drum. This way, the brake lining arranged at the brake shoes is brought into contact with the inner circumferential face of the brake drum, thereby producing frictional forces that provide the desired braking effect.

While existing drum brakes have a number of advantages compared to e.g. disc brake systems, some drawbacks remain. For example, existing drum brakes can be marked by a heavy weight in particular due to the brake drum typically being made from cast iron. Also, during braking substantial heat is generated which can lead to a thermal expansion of certain drum brake members. These may negatively affect a brake pedal feel due to altered relative distances between said drum brake members. For example, the drum brake may expand, thereby increasing a radial distance of its inner circumferential face relative to the brake lining carried by the brake shoes.

In the prior art, attempts have been made to provide weight reduction by configuring part of the brake drum (e.g. a brake drum housing) from lightweight materials while including a sufficiently rigid and stable member for contacting the brake lining carried by the brake shoes. An example can be found in EP 3 707 405 B1 disclosing a so-called frictional ring that is inserted into a fibre reinforced combination of a cylindrical casing and carrier pot. The actual brake lining or friction material remains at the brake shoes and is selectively brought into contact with said friction ring.

The present invention seeks to avoid at least some of the above drawbacks and in particular to provide a reliable drum brake that is marked by a reduced weight and preferably an improved thermal behaviour.

This object is solved by the invention as defined in the attached independent claims. Preferred embodiments are described in this description and in the dependent claims.

Accordingly, a drum brake assembly for a motor vehicle is disclosed, the drum brake assembly having:
 a brake drum housing;
 at least one brake shoe;
 a brake lining;
wherein the brake lining is arranged at an inner circumferential face (or inner circumference) of the brake drum housing and the brake shoe is displaceable relative to the brake lining (and thus brake drum housing), so as to contact the brake lining during braking (i.e., when or for activating the brake).

According to generally known configurations, the brake drum housing may be rotatable, e.g. by being coupled to a rotatable vehicle component such as the wheel hub. The brake shoe, on the other hand, may be stationary, e.g. due to being coupled to a stationary component of the vehicle, such as the chassis. In this context, stationary may mean not rotatable and/or stationary relative to a vehicle chassis, but e.g. being jointly movable with the travelling vehicle.

The brake drum housing may rotate about a rotational axis that may coincide with a rotational axis of a vehicle wheel that is braked by the drum brake assembly. Terms such as axial, radial or circumferential as used herein may refer to said rotational axis of the brake drum housing. A radial direction preferably extends at an angle and in particular orthogonally to said rotational axis. A circumferential direction may extend around the rotational axis, e.g. in a circular fashion There may be a plurality of brake shoes, e.g. at least two, at least three or at least four. These may be arranged at equal angular (i.e. circumferential) distances from another and/or equally spaced along the inner circumferential face of the brake drum housing.

The brake drum housing may also be referred to as a brake drum. It may have a cylindrical shape. It may have a cylinder mantle surface that extends about the rotational axis of the brake drum housing. It may have a base section connected to the cylinder mantle surface, e.g. connected to a preferably axially outer edge portion thereof. It may lack an opposite base section that would be connected to an opposite edge portion of the cylinder mantle surface. Overall, a one-sided opened cylinder and/or pot-shape of the brake drum housing may be provided.

The inner circumferential face of the brake drum housing may concentrically extend around the rotational axis. It may extend in parallel to said rotational axis, i.e. its surface normals may extend radially.

The brake lining may be fixed to the inner circumferential face and preferably extends along at least a circumferential section thereof. There may be a plurality of brake lining sections, each extending along a respective circumferential section. There may one substantially continuous brake lining (e.g. continuous apart from local apertures or local recesses) that extends along the complete inner circumferential face, which may result in a ring-shape brake lining discussed below. Alternatively, the brake lining may be composed of a number of brake lining segments or brake lining sections. These may e.g. be arranged adjacent and/or at (preferably small) distances from one another. This may include distributing such brake lining segments along the inner circumferential face in a ring-like fashion. As a result, the overall arrangement of brake lining segments may resembles a (non-continuous) ring extending along said inner circumferential face.

Generally, the brake lining may be correspondingly shaped to the inner circumferential face, e.g. by being similarly curved and/or arranged concentrically therewith. It may form at least part of an innermost surface of an assembly formed by the brake drum housing and brake lining. Preferably, it can be contacted from within the brake drum housing e.g. by the radially inner brake shoe.

The brake lining may be configured according to any known configurations in terms of materials and/or thickness and/or friction coefficient, but may be positioned differently compared to the prior art. For example, instead of being jointly movable with the brake shoe, it is preferably jointly movable (e.g. rotatable) with the brake drum housing. It may thus be rotatable relative to and/or around the brake shoe and/or the brake shoe may be displaceable relative to the brake lining. The latter may include a relative displacement to reduce a radial distance between the brake shoe and brake lining to zero (i.e. until contact). This may be achieved by any linear, tilting or rotational movements of the brake shoe as is producible with known drum brakes. For example, the brake shoe may be selectively tilted by a hydraulic cylinder in order to contact the rotating brake lining to produce a braking effect.

The brake lining may be removably attached to the brake drum housing. For example, it may be mechanically fixed to the brake drum housing, thus being removable when loosening the mechanical fixation. This way, the brake lining can be replaced when worn out, while keeping the brake drum housing for further use.

The brake shoe is preferably free of a brake lining. Instead, it may have a contact surface for contacting the brake lining, the contact surface being free of a brake lining and/or of a frictional material. The contact surface may be a smooth uniform surface, e.g. a metallic surface and in particular a cast iron surface. It may not experience substantial wear or at least less wear than the brake lining. The contact surface may be shaped (e.g. curved) correspondingly to the brake lining so as to achieve an areal contact therewith. For example, an areal contact of several square centimeters, e.g. at least 25 cm$^2$, may be provided.

The present solution provides a, figuratively speaking, hybrid brake drum housing that provides a stabilizing, protective and/or counter bearing function, but that also provides a carrier function for the brake lining. A resulting brake drum assembly may e.g. comprise the rigid and preferably one-piece brake drum housing to an inside of which the brake lining (e.g. in form of a continuous or non-continuous ring) is attached.

A general advantage of the disclosed solution is weight reduction. For example, the brake drum housing can be made from lighter materials than the currently used cast iron materials. Such a weight reduction of the brake drum housing is particularly effective as this a comparatively large part and, preferably, is a rotating component of the drum brake assembly. The resulting reduction of rotating mass helps to reduce fuel consumption.

Further, the brake shoe can be provided with advantageous thermal expansion characteristics. For example, it is generally preferred that the brake shoe is located on a (radial) inside of the brake lining and can be displaced radially outwardly relative to the (preferably radially stationary) brake lining to come in contact therewith. When thermally expanding, e.g. in reaction to frequent brake activation, a contact surface of the brake shoe may move radially outward and towards the brake lining. Even if the brake drum housing thermally expands as well, a possible increase in the radial distance between the contact surface and brake lining can at least partially compensated for by this outward radial extension of the brake show.

This is different from existing solutions in which the contact surface for contacting the brake lining is provided at the brake drum housing. In this existing case, upon thermal expansion, the contact surface moves radially outward and thus away from a radially inner brake lining carried by a brake shoe (which due to a lower thermal expansion coefficient typically maintains its radial position). As a result, the radial distance between the brake lining and contact surface increases which negatively impacts brake pedal feel. For example, the brake can be less responsive from the driver's perspective. Because such an increase in the radial distance can presently be prevented, a similar lack of responsiveness is less likely to occur and pedal feel is improved.

Still further, by arranging the brake lining at the brake drum housing at thus on a radial outside of the brake shoes, the effective radius of the brake lining is increased (e.g. compared to known configurations where the brake lining is arranged on a radial inside of the brake shoes). The effective radius e.g. affects a braking toque that results from the friction forces generated during braking. For example, the brake lining may be configured with a larger surface area compared to the known configurations. Thus, a (radial) thickness of the brake lining can be reduced (e.g. due to instead increasing the surface area). As a result, friction forces are generated at an increased radial distances from the rotational axis and thus at an increased effective radius.

The brake lining may be sized, e.g. in terms of thickness and/or volume, to cover a defined total operating life cycle of a given vehicle and based on an expected extent of brake activations. This life cycle may e.g. include 250.000 kilometers of driving distance or a ten years driving period. This may help to avoid expensive operating costs.

According to a preferred embodiment, the brake lining comprises a friction material, the friction material for example comprising friction fibers or friction particles (e.g. metallic particles) and a binder. Accordingly, the friction material may be or comprise a material composition with particles and/or fibers distributed in a (rigid) binder material.

Additionally or alternatively, at least a contact surface of the brake shoe that is configured to contact the brake lining during braking is made from a material that is different from the material of the brake lining, e.g. that is not a friction and/or brake lining material.

Preferably, at least the contact surface (or the complete brake shoe) comprises a material that is harder than a material of the brake lining. This reduces wear of the contact surface compared to the brake lining. Additionally or alternatively, a friction coefficient of the contact surface may be smaller than that of the friction material.

In one example, the brake shoe is made of or comprises a metallic material and in particular cast iron. For example, the brake shoe (or at least a portion thereof comprising the contact surface) may be a one-piece metal cast part. The cast iron material may be a spheroidal graphite iron material. The brake lining, to the contrary, may not be a metal cast part and/or may not be made of or comprise cast iron.

By using a metallic material and in particular cast iron for the brake shoe, a preferable thermal expansion characteristic can be achieved. This in particular helps to limit increases of the radial distances form the brake lining.

According to a preferred embodiment, the brake drum housing is made from or comprises a material that is different from a material of the brake lining and/or the brake shoe. In particular, said material may be lighter than a material of the brake lining and/or the brake shoe. Again, this can help to reduce weight and in particular the rotating mass. Also, this may allow to provide suitable individual material selections for each of the brake drum housing, brake lining and/or brake shoe, e.g. with regard to any of weight, rigidity, hardness, friction coefficient or thermal expansion.

In one aspect, the material of the brake shoe has a larger coefficient of thermal expansion than a material of the brake lining and/or of the brake drum housing. This means that the brake shoe may show a larger expansion at same temperature changes compared the brake lining and/or the brake drum housing. This is beneficial for providing the above-discussed limitation of an increasing radial distance between the brake lining and contact surface of the brake shoe at frequent brake activation.

Preferably, the brake lining forms at least a section of a ring that extends along the inner circumferential face of the brake drum housing. For example, the brake lining may form a continuous or closed ring that extends along the complete inner circumferential face. Put differently, the brake lining may form a ring-shaped material layer. This increases the effective surface area of the brake lining and may allow for a reduction of thickness of the brake lining to increase an effective radius (see above). Also, this may be beneficial in terms of production and/or replacement of the brake lining. It may also improve support by and fixation of the brake lining to the brake drum housing.

In one example, the brake lining comprises a number of brake lining segments or, put differently, is a multi-piece assembly. The brake lining segments may be arranged or distributed in a ring-like manner along the inner circumferential surface. They may be arranged at circumferential distances from one another so that a non-continuous or, in other words, locally interrupted ring is formed.

The invention also concerns a brake drum assembly for a motor vehicle,
the brake drum assembly having a brake drum housing and a brake lining, wherein the brake lining
is arranged at an inner circumferential face of the brake drum housing.

Generally, the brake drum assembly may be configured to be used in a drum brake assembly according to any of the aspects disclosed herein. Also, the brake drum assembly (and in particular its brake drum housing and brake lining) may be configured according to any of the features, embodiments and variants disclosed herein e.g. in the context of the drum brake assembly.

The invention also concerns a method for producing a brake drum assembly for a motor vehicle, the method comprising arranging a brake lining at an inner circumferential face of a brake drum housing, in particular so that the brake lining forms a ring-shaped layer extending along an inner circumferential face of the brake drum housing.

The method may include any further steps and measures to produce a brake drum assembly or drum brake assembly according to any of the embodiments disclosed herein. For example, it may include arranging a brake shoe according to any of the disclosed examples radially inside of the brake lining and/or so as to be displaceable relative to the brake lining.

Embodiments of the invention are described in further detail below with respect to the attached schematic figures. Same features may be marked with the same reference signs throughout the figures.

FIG. 1 shows a drum brake assembly 10 according to a first embodiment of the invention. The drum brake assembly 10 is depicted in a sectional view with the sectional plane including a rotational axis R.

Figure 1:
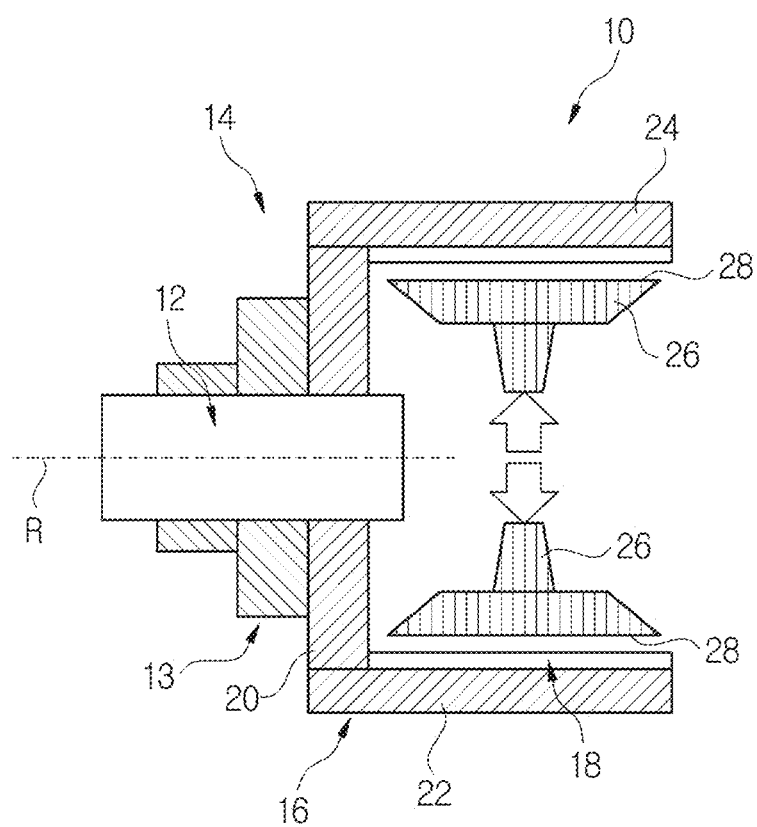
FIG. 1 is sectional view of a drum brake assembly according to a first embodiment, the sectional plane including a rotational axis of the brake drum housing.

The drum brake assembly 10 is mounted to an axle stub 12 which also carries a wheel hub 13. The drum brake assembly 10 comprises a brake drum assembly 14 having a brake drum housing 16 and a brake lining 18. Both of the brake drum housing 16 and brake lining 18 are rotationally symmetric with respect to the rotational axis R.

The brake drum housing 16 is a one-sided opened cylindrical member having a (in FIG. 1) left base portion 20 that extends at an angle and preferably orthogonally to the rotational axis R. Further, it comprises a cylinder mantle portion 22 that preferably extends in parallel to the rotational axis R. On the other hand, it lacks a right base portion opposite to the left base portion 20. This shape of the brake drum housing 16 may correspond to known shapes, but the brake drum housing 16 is not limited thereto it may e.g. be configured according to other known shapes known in the prior art.

The brake drum housing 16 is fixed to the axle stub 12 and/or wheel hub 13 so as to jointly rotate therewith. A non-depicted wheel is also connected to the wheel hub 13 for a joint rotation therewith and thus jointly rotates with the brake drum housing 16. According to known configurations, the wheel hub 13 may comprise non-depicted bolts that axially extend towards the right side of FIG. 1 and through the base portion 20 of the brake drum housing 16 for mounting the wheel thereto.

The brake lining 18 is configured as a continuous ring-shaped material layer of limited thickness (the thickness being measured in a radial direction). It is arranged at and preferably releasably fixed to an inner circumferential face 24 of the brake drum housing 16. In the shown example, the inner circumferential face 24 is comprised by the cylinder mantle portion 22. Therefore, the brake lining 18 forms an innermost surface of the drum brake assembly 14 that is contactable from a radial inside of the brake drum housing 16 and specifically from a radial inside of the cylinder mantle portion 22.

The brake lining 18 is made from a friction material according to known configurations and specifically from a friction material according to any of the examples disclosed herein.

The drum brake assembly 10 further comprises two brake shoes 26, this number being a mere example. The brake shoes 26 are made from a metallic material and preferably from cast iron. They do not comprise a brake lining material and are generally made from a different material compared to the brake lining 18. On their radial outside facing the brake lining 18, the brake shoes 26 each comprise a contact surface 28 that are correspondingly curved to the brake lining 18 (see also FIGS. 2 and 3 below).

The brake shoes 26 are radially displaceable towards and away from the brake lining 18, e.g. by making use of any of the existing technologies in the prior art. For example, non-depicted hydraulic cylinders may be used to provide said displacement. The displacement indicated by arrows in FIG. 1.

As a result of said displacement, each contact surface 28 can be brought into contact with a respectively opposite brake lining 18 to generate frictional forces, thereby reducing the speed of rotation of the non-depicted wheel.

At frequent brake activations, high thermal loads may occur as a result of the generated frictional forces. The metallic brake shoes 26 may in reaction thereto thermally expand. This thermal expansion takes place towards the brake lining 18, thereby reducing a radial distance thereto. In particular, the thermal radial expansion towards the brake lining 18 may be larger than a possibly occurring thermal radial expansion of a brake drum assembly 14 that radially moves the brake lining 18 outward and thus (theoretically) away from the brake shoes 26.

From the driver's perspective, this means that contrary to existing solutions, the brake pedal feel continues to show a satisfactory responsiveness even at high thermal loads due to a limited or even no increase in the brake pedal travel. That is, a problem known from the prior art according to which a radial distance of the (in the prior art) radially inner brake lining from a (in the prior art radially outer) contact surface increases at high thermal loads is prevented.

Figure 2:
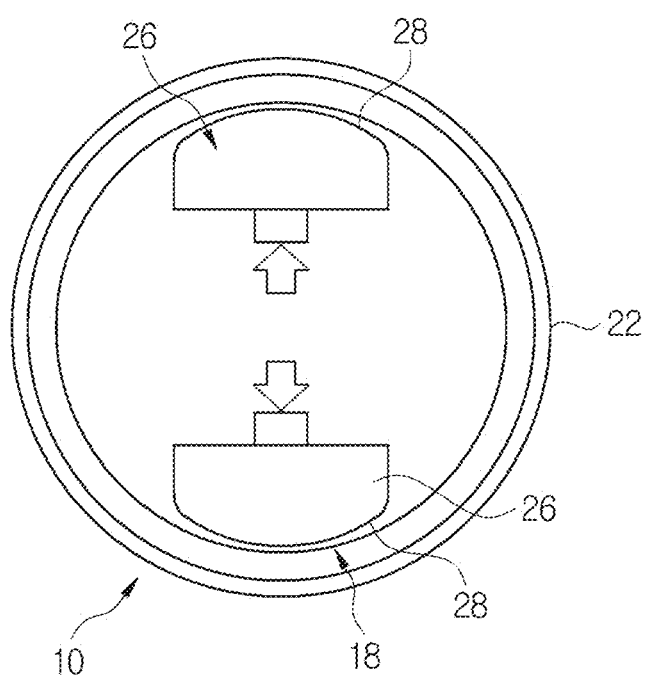
FIG. 2 is a front view of the drum brake assembly of the first embodiment.

FIG. 2 is a front view of the embodiment of FIG. 1 with the rotational axis R extending orthogonally to the image plane. From this figure, the ring-shaped configuration of the brake lining 18 at a radial outside of and/or circumferentially surrounding the brake shoes 26 is particularly clear. Also, the curved shape of the contact surfaces 28 of the brake shoes 26 is shown. Again, arrows indicate the possibility of a linear displacement of the brake shoes 26 towards the brake lining 18 to produce a braking effect.

Figure 3:
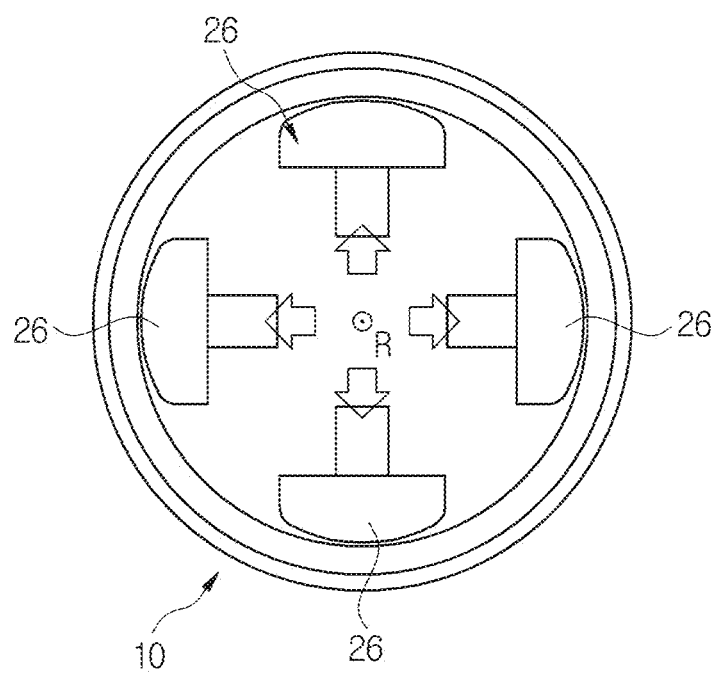
FIG. 3 is front view of a drum brake assembly according to a second embodiment.

FIG. 3 is a front view similar to FIG. 2 but depicting a further embodiment with an increased number of brake shoes 26. Specifically, four brake shoes 26 are shown that are equally spaced apart from one another at angles of 90°.

The invention claimed is:

1. A drum brake assembly (10) for a motor vehicle, the drum brake assembly (10) having:
   a brake drum housing (16);
   at least one brake shoe (26);
   a brake lining (18);
   wherein the brake lining (18) is arranged at an inner circumferential face (24) of the brake drum housing (16) and the brake shoe (26) is displaceable relative to the brake lining (18), so as to contact the brake lining (18) during braking, and
   wherein a material of the brake shoe (26) has a larger coefficient of thermal expansion than a material of the brake lining (18) and/or of the brake drum housing (16).

2. The drum brake assembly (10) according to claim 1, wherein the brake lining (18) comprises a friction material.

3. The drum brake assembly (10) according to claim 1; wherein at least a contact surface (28) of the brake shoe (26) that is configured to contact the brake lining (18) during braking is made from a material that is different from the material of the brake lining (18).

4. The drum brake assembly (10) according to claim 3, wherein at least the contact surface (28) of the brake shoe (26) comprises a material that is harder than the material of the brake lining (18).

5. The drum brake assembly (10) according to claim 1, wherein the brake shoe (26) comprises a metallic material and cast iron.

6. The drum brake assembly (10) according to claim 1, wherein the brake drum housing (16) comprises a material that is different from the material of the brake lining (18) and that is lighter than the material of the brake lining (18).

7. The drum brake assembly (10) according to claim 1, wherein the brake lining (18) forms a continuous ring extending along the inner circumferential face (24) of the brake drum housing (1816).

8. The drum brake assembly (10) according to claim 1, wherein the brake lining (18) comprises a number of brake lining segments that are arranged in a ring-like manner along the inner circumferential surface (24).

9. Brake drum assembly (14) for a motor vehicle, the brake drum assembly (14) having a brake drum housing (16) and a brake lining (18), wherein the brake lining (18) is arranged at an inner circumferential face (24) of the brake drum housing (16),
   wherein a brake shoe (26) is displaceable relative to the brake lining (18), so as to contact the brake lining (18) during braking, and
   wherein a material of the brake shoe (26) has a larger coefficient of thermal expansion than a material of the brake lining (18) and/or of the brake drum housing (16).

* * * * *